US007933197B2

(12) United States Patent
Bryant et al.

(10) Patent No.: US 7,933,197 B2
(45) Date of Patent: *Apr. 26, 2011

(54) METHOD AND APPARATUS FOR CONSTRUCTING A REPAIR PATH AROUND A NON-AVAILABLE COMPONENT IN A DATA COMMUNICATIONS NETWORK

(75) Inventors: Stewart Frederick Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 683 days.

This patent is subject to a terminal disclaimer.

(21) Appl. No.: 11/064,275

(22) Filed: Feb. 22, 2005

(65) Prior Publication Data

US 2006/0187819 A1 Aug. 24, 2006

(51) Int. Cl.
*G01R 31/08* (2006.01)
*G06F 11/00* (2006.01)
*G08C 15/00* (2006.01)
*H04L 12/28* (2006.01)

(52) U.S. Cl. .................. 370/216; 370/217; 370/256

(58) Field of Classification Search .................. 370/216, 370/242, 217, 248, 254, 255, 256
See application file for complete search history.

(56) References Cited

U.S. PATENT DOCUMENTS

| 4,956,835 | A | 9/1990 | Grover et al. |
| 5,243,592 | A | 9/1993 | Perlman et al. |
| 5,825,772 | A | 10/1998 | Dobbins et al. |
| 5,959,968 | A | * | 9/1999 | Chin et al. ............. 370/216 |
| 6,018,576 | A | | 1/2000 | Croslin |
| 6,032,194 | A | * | 2/2000 | Gai et al. ............. 709/239 |
| 6,044,075 | A | | 3/2000 | Le Boudec et al. |
| 6,098,107 | A | | 8/2000 | Narvaez-Guarnieri et al. |
| 6,111,257 | A | | 8/2000 | Shand et al. |
| 6,128,750 | A | | 10/2000 | Espy et al. |
| 6,148,410 | A | | 11/2000 | Basket et al. |
| 6,185,598 | B1 | | 2/2001 | Farber et al. |
| 6,243,754 | B1 | | 6/2001 | Guerin et al. |
| 6,246,669 | B1 | | 6/2001 | Chevalier et al. |

(Continued)

FOREIGN PATENT DOCUMENTS

CN 1440159 A 9/2003
(Continued)

OTHER PUBLICATIONS

Andersson, L. et al.,"LDP Specification," Network Working Group RFC 3036, Jan. 2001, 118 pages.

(Continued)

*Primary Examiner* — Chi H Pham
*Assistant Examiner* — Farah Faroul
(74) *Attorney, Agent, or Firm* — Hickman Palermo Truong & Becker LLP

(57) ABSTRACT

A method of constructing a repair path around a non-available component in a data communications network having, as components, nodes having a network address and links there between comprises the step, performed at a participating node, of receiving from a notifying node in the network, a notification identifying the notifying node and components through which the notifying node can be reached. The method further comprises the step of deriving, from the notification, a network repair address for use in the event of non-availability of a component identified in the notification. The method further comprises the step of constructing a repair path for the repair address.

31 Claims, 11 Drawing Sheets

U.S. PATENT DOCUMENTS

| | | |
|---|---|---|
| 6,256,295 B1 | 7/2001 | Callon |
| 6,295,275 B1 | 9/2001 | Croslin |
| 6,321,271 B1 | 11/2001 | Kodialam et al. |
| 6,343,122 B1 | 1/2002 | Andersson |
| 6,349,091 B1 | 2/2002 | Li |
| 6,356,546 B1 | 3/2002 | Beshai |
| 6,389,764 B1 | 5/2002 | Stubler et al. |
| 6,473,421 B1 | 10/2002 | Tappan |
| 6,507,577 B1 | 1/2003 | Mauger et al. |
| 6,578,086 B1 | 6/2003 | Regan et al. |
| 6,690,671 B1 | 2/2004 | Anbiah et al. |
| 6,697,325 B1 | 2/2004 | Cain |
| 6,697,333 B1 | 2/2004 | Bawa et al. |
| 6,704,320 B1 | 3/2004 | Narvaez et al. |
| 6,711,125 B1 | 3/2004 | Walrand et al. |
| 6,714,551 B1 | 3/2004 | Le-Ngoc |
| 6,718,382 B1 | 4/2004 | Li et al. |
| 6,721,269 B2 | 4/2004 | Cao et al. |
| 6,744,727 B2 | 6/2004 | Liu et al. |
| 6,778,531 B1 | 8/2004 | Kodialam et al. |
| 6,829,215 B2 | 12/2004 | Tornar |
| 6,928,484 B1 | 8/2005 | Huai et al. |
| 6,944,131 B2 | 9/2005 | Beshai et al. |
| 6,950,870 B2 | 9/2005 | Beaulieu |
| 6,982,951 B2 | 1/2006 | Doverspike et al. |
| 6,987,727 B2 | 1/2006 | Fredette et al. |
| 6,990,068 B1 | 1/2006 | Saleh et al. |
| 6,996,065 B2 | 2/2006 | Kodialam et al. |
| 7,058,016 B1 | 6/2006 | Harper |
| 7,099,286 B1 | 8/2006 | Swallow |
| 7,113,481 B2 | 9/2006 | Elie-Dit-Cosaque et al. |
| 7,158,486 B2 | 1/2007 | Rhodes |
| 7,177,295 B1 | 2/2007 | Sholander et al. |
| 7,242,664 B2 | 7/2007 | Einstein et al. |
| 7,260,645 B2 | 8/2007 | Bays |
| 7,274,654 B2 | 9/2007 | Yang et al. |
| 7,274,658 B2 | 9/2007 | Bornstein et al. |
| 7,420,989 B2 * | 9/2008 | Liu et al. ............... 370/468 |
| 7,490,165 B1 | 2/2009 | Katukam et al. |
| 7,519,009 B2 | 4/2009 | Fleischman |
| 2002/0037010 A1 | 3/2002 | Yamauchi |
| 2002/0062388 A1 | 5/2002 | Ogier et al. |
| 2002/0093954 A1 | 7/2002 | Weil et al. |
| 2002/0112072 A1 | 8/2002 | Jain |
| 2002/0116669 A1 | 8/2002 | Jain |
| 2002/0131362 A1 | 9/2002 | Callon |
| 2002/0171886 A1 | 11/2002 | Wu et al. |
| 2002/0172157 A1 | 11/2002 | Rhodes |
| 2002/0191545 A1 | 12/2002 | Pieda et al. |
| 2003/0007500 A1 | 1/2003 | Rombeaut et al. |
| 2003/0063613 A1 | 4/2003 | Carpini et al. |
| 2003/0079040 A1 | 4/2003 | Jain et al. |
| 2003/0117950 A1 * | 6/2003 | Huang ............... 370/220 |
| 2003/0123457 A1 | 7/2003 | Koppol |
| 2003/0193959 A1 | 10/2003 | Lui et al. |
| 2003/0202473 A1 * | 10/2003 | Patrick et al. ............... 370/235 |
| 2003/0210705 A1 | 11/2003 | Seddigh et al. |
| 2003/0233595 A1 | 12/2003 | Charny et al. |
| 2004/0001497 A1 | 1/2004 | Sharma |
| 2004/0071089 A1 | 4/2004 | Bauer et al. |
| 2004/0085894 A1 | 5/2004 | Wang et al. |
| 2004/0117251 A1 | 6/2004 | Shand |
| 2004/0151181 A1 | 8/2004 | Chu et al. |
| 2004/0190454 A1 | 9/2004 | Higasiyama |
| 2004/0205239 A1 | 10/2004 | Doshi et al. |
| 2005/0007950 A1 * | 1/2005 | Liu ............... 370/221 |
| 2005/0013241 A1 * | 1/2005 | Beller et al. ............... 370/216 |
| 2005/0031339 A1 | 2/2005 | Qiao et al. |
| 2005/0038909 A1 | 2/2005 | Yoshiba et al. |
| 2005/0068968 A1 | 3/2005 | Ovadia et al. |
| 2005/0097219 A1 | 5/2005 | Goguen et al. |
| 2005/0201273 A1 | 9/2005 | Shimizu |
| 2005/0201371 A1 * | 9/2005 | Lauer ............... 370/389 |
| 2005/0265228 A1 * | 12/2005 | Fredette et al. ............... 370/216 |
| 2006/0018253 A1 | 1/2006 | Windisch et al. |
| 2006/0031482 A1 | 2/2006 | Mohan et al. |
| 2006/0050630 A1 | 3/2006 | Kobayashi et al. |
| 2006/0092941 A1 | 5/2006 | Kusama |
| 2006/0140111 A1 | 6/2006 | Vasseur et al. |
| 2006/0140190 A1 | 6/2006 | Lee |
| 2006/0187819 A1 | 8/2006 | Bryant et al. |
| 2006/0193252 A1 | 8/2006 | Naseh et al. |
| 2006/0221962 A1 | 10/2006 | Previdi et al. |
| 2006/0291446 A1 | 12/2006 | Caldwell et al. |
| 2007/0005784 A1 | 1/2007 | Hares et al. |
| 2007/0011284 A1 | 1/2007 | Le Roux et al. |
| 2007/0011351 A1 | 1/2007 | Bruno et al. |
| 2007/0038767 A1 | 2/2007 | Miles et al. |
| 2007/0091793 A1 | 4/2007 | Filsfils et al. |
| 2007/0091794 A1 | 4/2007 | Filsfils et al. |
| 2007/0091795 A1 | 4/2007 | Bonaventure et al. |
| 2007/0115810 A1 | 5/2007 | Stamatelakis et al. |
| 2008/0025203 A1 * | 1/2008 | Tallet ............... 370/216 |
| 2008/0062986 A1 | 3/2008 | Shand et al. |
| 2008/0089227 A1 * | 4/2008 | Guichard et al. ............... 370/228 |
| 2008/0192627 A1 | 8/2008 | Lichtwald |
| 2008/0219153 A1 | 9/2008 | Shand et al. |
| 2008/0317055 A1 | 12/2008 | Zetterlund et al. |
| 2009/0129771 A1 | 5/2009 | Saniee et al. |

FOREIGN PATENT DOCUMENTS

| | | |
|---|---|---|
| WO | WO 01/78278 A1 | 10/2001 |
| WO | WO 02/06918 | 1/2002 |

OTHER PUBLICATIONS

Bryant, S. et al, "IP fast Reroute Using Tunnels," Network Working Group, Internet Draft, May 2004, 27 pages.

Pan, P et al., "Fast Reroute Extensions to RSVP-TE for LSP Tunnels," Network Working Group RFC 4090, May 2005, 34 pages.

Shand, M. et al., "IP Fast Reroute Framework," Network Working Group, Internet Draft, Jun. 2004, 10 pages.

Thorup, Mikkel, "Fortifying OSPF/IS-IS Against Link-failure," AT&T Labs-Research, Sep. 7, 2001, 10 pages.

Tian, Albert J. et al., "Loose Segment Optimization in Explicit Paths," Network Working Group, Internet Draft, Jul. 2004, 8 pages.

Tian, Albert J. et al., Source Routed MPLS LSP Using Domain Wide Label, Network Working Group, Internet Draft, Jul. 2004, 11 pages.

Zinin, Alex, "Analysis and Minimization of Microloops in Link-state Routing Protocols," Network Working Group, Internet Draft, Oct. 2004, 10 pages.

Notification of Transmittal of the International Search Report and the Written Opinion of the International Searching Authority, or the Declaration as received in corresponding International application No. PCT/US06/06238.

Pending claims in PCT/US06/06238.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

Office Action from EPO for foreign patent application No. 04 800 942.7-1525 dated Apr. 27, 2009, (6 pgs).

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People'S Republic of China, "The First Office Action", filing No. 200680001652.0, May 8, 2009, 15 pages.

Claims, filing No. 200680001652.0, 4 pages.

European Patent Office, "Supplementary European Search Report", application No. EP 06720965, dated Jul. 21, 2009, 6 pages.

Claims, application No. EP 06720965, 4 pages.

European Patent Office, "Communication pursuant to Article 94(3) EPC", Application No. 04795045.6-2416, dated Sep. 7, 2009, 5 pages.

Current Claims, Application No. 04795045.6-2416, 5 pages.

Moy, J et al., "OSPF Version 2", IETF Standard, Network Working Group, Internet Engineering Task Force, IETF, Apr. 1998, XP015008112, NFC 2328, 245 pages.

European Patent Office, "Supplementary Search Report", application No. EP 04812468, dated May 27, 2010, 4 pages.

Claims, application No. EP 04812468, 4 pages.

Notice of Allowance dated May 23, 2008 for U.S. Appl. No. 10/719,003 filed Nov. 21, 2003.

Final Office Action dated Jan. 7, 2009 for U.S. Appl. No. 11/175,805 filed Jul. 5, 2005.

Final Office Action dated Feb. 19, 2010 for U.S. Appl. No. 11/851,255 filed Sep. 6, 2007.

Final Office Action dated Dec. 3, 2009 for U.S. Appl. No. 11/393,166 filed Mar. 29, 2006.

Office Action dated Mar. 2, 2010 for U.S. Appl. No. 11/175,805 filed Jul. 5, 2005.

Office Action dated Mar. 23, 2010 for U.S. Appl. No. 10/346,051 filed Jan. 15, 2003.

Advisory Action dated Mar. 24, 2010 for U.S. Appl. No. 11/393,166 filed Mar. 29, 2006.

Office Action dated May 25, 2010 for U.S. Appl. No. 11/393,166 filed Mar. 29, 2006.

Notice of Allowance dated Aug. 16, 2010 for U.S. Appl. No. 10/346,051 filed Jan. 15, 2003.

Notice of Allowance dated Aug. 6, 2010 for U.S. Appl. No. 11/175,805 filed Jul. 5, 2005.

U.S. Appl. No. 11/393,166, filed Mar. 29, 2006, Notice of Allowance, mailed Sep. 29, 2010.

Translated Abstract for CN application serial No. 200410056187.3 dated Aug. 18, 2004 (1 pg), with CN application (13 pgs).

Published Specification for Publication No. CN 1738286A dated Feb. 22, 2006 for CN application No. 200410056187.3 dated Aug. 18, 2004 (13 pgs).

* cited by examiner

PRIOR ART

Fig 4

| NEIGHBOUR | METRIC | NOTVIA ADDRESS |
|---|---|---|
| A | $\alpha$ | a.a.a.a.($P\bar{a}$) |
| B | $\beta$ | b.b.b.b ($P\bar{b}$) |
| C | $\gamma$ | c.c.c.c ($P\bar{c}$) |
| S | $\zeta$ | d.d.d.d ($P\bar{d}$) |

Fig 5

| DESTINATION ADDRESS | NEXT_HOP | REPAIR ADDRESS | REPAIR NEXT_HOP |
|---|---|---|---|
| B | P | B$\bar{p}$ | Z |
| D | P | B$\bar{p}$ | Z |
| A | P | A$\bar{p}$ | $\Omega_1$ |
| C$\bar{p}$ | Y | — | |

| DESTINATION ADDRESS | NEXT HOP |
|---|---|
| D | $\Omega_2$ |
| B | $\Omega_2$ |
| $B\overline{p}$ | $\Omega_2$ |

600 — DESTINATION ADDRESS
602 — NEXT HOP

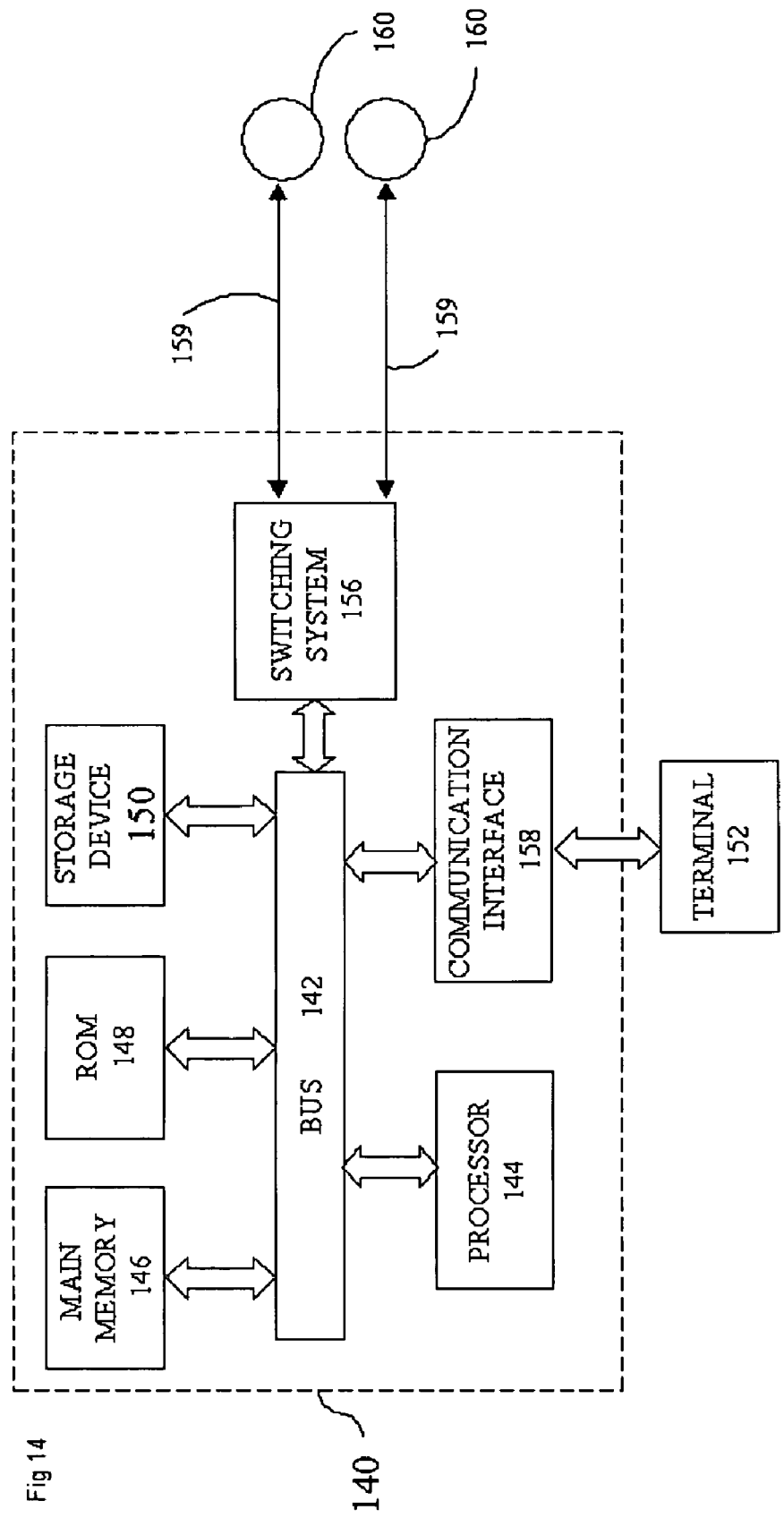

US 7,933,197 B2

METHOD AND APPARATUS FOR CONSTRUCTING A REPAIR PATH AROUND A NON-AVAILABLE COMPONENT IN A DATA COMMUNICATIONS NETWORK

FIELD OF THE INVENTION

The present invention generally relates to data communication networks. The invention relates more specifically to constructing a repair path around a non-available component in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately: When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node ("NEXT_HOP") along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated that induces creating a loop in the RIB or FIB. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

One solution that has been proposed to the looping problem is described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al, where a repairing node detects failure of an adjacent component, then the repairing node computes a first set of nodes comprising the set of all nodes reachable according to its protocol other than nodes reachable by traversing the failed component. The repairing node then computes a second set of nodes comprising the set of all nodes from which a target node is reachable without traversing the failed component. The method then determines whether any intermediate nodes exist in the intersection between the first and second sets of nodes or a one-hop extension thereof and tunnels packets for the target node to a tunnel end point comprising a node in the intersection of the first and second sets of nodes.

The solution described in Miles et al can be further understood with reference to FIG. 1 which depicts an illustrative network diagram to which the solution is applied. A network includes a node P, reference numeral 10 to which nodes A, B, C and S, reference numerals 12, 14, 16, 18, are attached via respective links 20, 22, 24, 26. In the event of failure of node P, node S, acting as a repairing node, computes a first set of nodes reachable other than by the failed component, termed here node S's P-space, $P_S$ reference numeral 28. Node S also computes the nodes from which a target node B is reachable without traversing node P, termed here node B's Q-space $B_Q$ reference numeral 30. The repairing node, node S, then identifies that node E in $P_S$ and node F in $Q_B$, reference numerals 32, 34, are within one hop of each other via link 36. Node S then tunnels packets to node E via path 38, that is to say, node S encapsulates a packet and attaches, as a destination header, the address of node E. In order for the packet to traverse link 36, node S also adds a "direct forwarding" instruction to the encapsulated packet such that node E, upon decapsulating the packet forwards to node F irrespective of its next hop to node B. Once the packet reaches node F then, by definition, it will reach node B, via path 40 in node B's Q space $Q_B$.

An extension of the approach is described in co-pending patent application Ser. No. 10/976,076, filed 27th Oct. 2004, entitled "Method and Apparatus for Forwarding Data in a Data Communications Network" of George Swallow et al ("Swallow et al") the entire contents of which are incorporated by reference for all purposes as if fully set forth herein. According to this extension, the repairing node further calculates the Q-space of the other neighbors to the failed node, forming an "extended Q-space" and forwards the packet to a node in the intersection of P-space $P_S$ and the extended Q-space. Referring once again to FIG. 1, for example, the repairing node, node S identifies that the node E', reference numeral 42 is reachable via a path 44 and lies in C's Q-space $Q_C$, reference numeral 45. The packet is then forwarded across Q-space $Q_C$ via path 44 to a node F', reference numeral 46, which also falls in B's Q-space $Q_B$ and from which it is forwarded to node B via path 48.

The approach in Miles et al and Swallow et al can be implemented both for node and link failure. In the case of link failure, various solutions are proposed to avoid looping between the repairing node and neighbors of the node connected to the repairing node via the failed link and which may be implementing a conflicting repair strategy, that is to say between node S and nodes A, B and C in FIG. 1 in the event of failure of link 26.

One such solution is described in co-pending patent application Ser No. 10/346,051, filed 15th Jan. 2003, entitled "Method and Apparatus for Determining a Data Communication Network Repair Strategy" of Michael Shand et al ("Shand et al") the entire contents of which are incorporated by reference for all purposes as if fully set forth herein. According to this approach a repairing node sends a probe packet along a repair path and, if the probe is returned, a loop is identified. A further solution is described in co-pending patent application Ser. No. 10/848,669, filed 18th May 2004, entitled "Method and Apparatus for Forwarding Data in a Data Communications Network" of Michael Shand et al ("Shand et al II") the entire contents of which are incorporated by reference for all purposes as if fully set forth herein. According to the approach described in Shand et all II a repair packet is marked as repaired to avoid looping.

Whilst such systems provide rapid network recovery in the event of a failed component the use of P and Q-space means that in many instances the repair path selected is not the shortest available repair path. Furthermore additional forwarding mechanisms such as directed forwarding are required in some instances. Yet further additional layers of encapsulation are required in certain instances, for instance in the case of use of extended Q-space or for instances such as multi-homed prefixes (MHP). Multiple encapsulation is undesirable for example because of the requirement for additional checksum calculations.

Many of these problems arise because, when a link or a router fails, only the neighbors of the failure are initially aware that the failure has occurred. According to the solution described above the failure is repaired by the routers that are the neighbors of the failure. These repairing routers have to steer packets to their destinations despite the fact that most other routers in the network are unaware of the nature and location of the failure.

A further known approach is described in "Fast Re-route using Alternative Shortest Paths" which is available at the time of writing on the file "draft-tian-ffr-alt-shortest-path-01.txt" in the directory "pub/id" of the domain "watersprings.org" on the World Wide Web. According to the approach described in this document a repairing node and each of its next hops calculate alternative shortest paths as repair paths around potential neighbor node failures by identifying a termination point for packets in the event of such failure and calculating alternate shortest paths by removing the failed node from the link state database. However this approach requires construction of explicit paths using, for example, source routing to encode the path in the packet itself

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a schematic representation of information carried in an LSP according to the present approach;

FIG. 5 is a diagram illustrating a forwarding table constructed at a neighbor node to a non-available node;

FIG. 14 is a block diagram that illustrates a computer system upon which a method for constructing a repair path may be implemented.

DETAILED DESCRIPTION OF THE PREFERRED EMBODIMENT

A method and apparatus for constructing a repair path around a non-available component in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Repair Path
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of constructing a repair path around a non-available component in a data communications network having, as components, nodes having a network address and links there between. The method comprises the step, performed at a participating node, of receiving from a notifying node in the network, a notification identifying the notifying node and components through which the notifying node can be reached. The method further comprises the step of deriving, from the notification, a network repair address for use in the event of non-availability of a component identified in the notification. The method further comprises the step of constructing a repair path for the repair address.

In other aspects, the invention encompasses a computer apparatus and a computer-readable medium configured to carry out the foregoing steps.

2.0 Structural and Functional Overview

Figure 1:
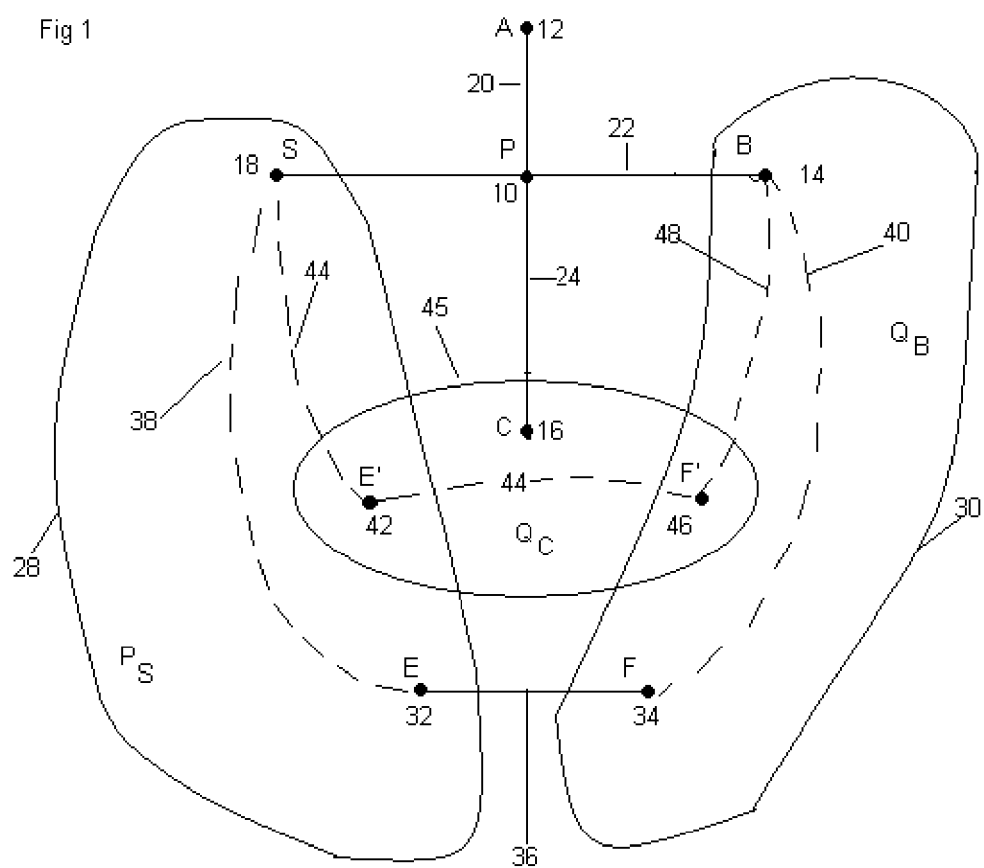
FIG. 1 is a representation of a network illustrating a method of constructing a repair path according to known approaches.
Figure 2:
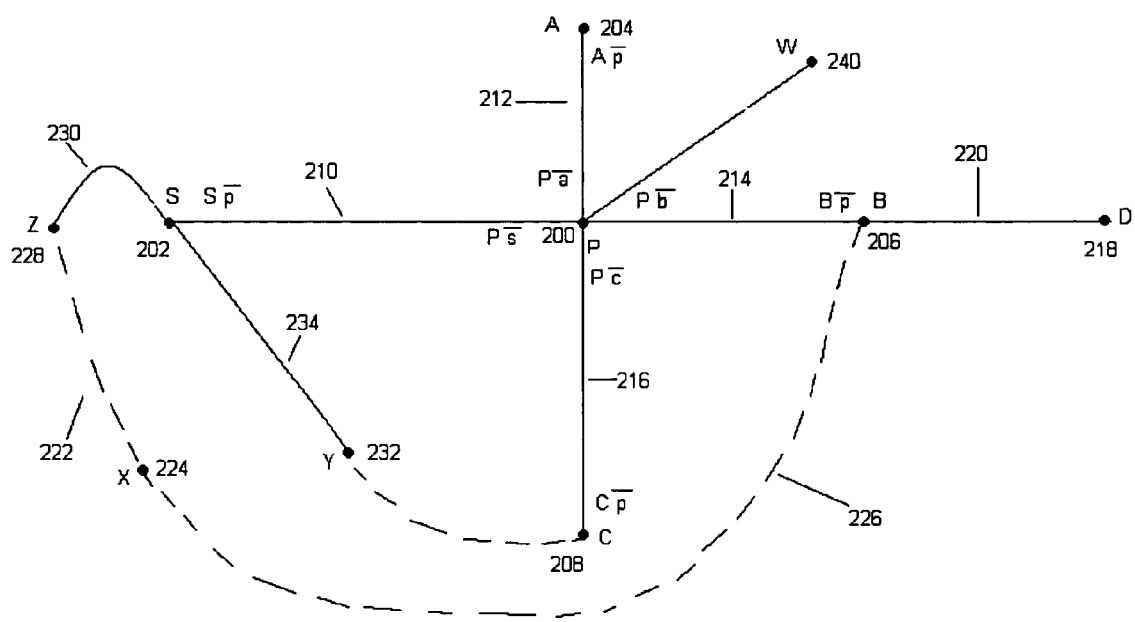
FIG. 2 is a representation of a network illustrating a method of constructing a repair path according to the present approach.

In overview a method for constructing a repair path can be understood with reference to FIG. 2 which depicts an illustrative network diagram to which the method is applied. The network includes a primary node P, reference numeral 200, a source node S, and nodes, A, B and C, reference numerals 202, 204, 206, 208 each connected to node P via respective links 210, 212, 214, 216. A further node D, reference numeral 218 is connected to node B via link 220. In addition to the standard addresses assigned to each node, each interface in the network is assigned an additional repair address. This is termed here the "notvia address" although it will be appreciated that this term is arbitrary, descriptive and non-limiting. The semantics of a notvia address are that a packet addressed to a notvia address must be delivered to the router with that address, notvia the neighboring router on the interface to which that address is assigned.

For example the interfaces from node P to nodes S, A, B, C by respective links 210, 212, 214, 216, may have addresses Pa, Pb, Pc and Ps. Similarly the interfaces from nodes A, B, C and S to node P via links 212, 214, 216, 210 respectively in the opposite direction have addresses Ap, Bp, Cp, Sp.

To repair a failure, a repairing node, for example node S, encapsulates the packet to the notvia address of the node interface on the far side of the failure. The nodes on the repair path then know to which node they must deliver the packet, and which network component they must avoid.

Referring to FIG. 2, assuming that S has a packet for some destination D that it would normally send via P and B, and that S suspects that P has failed, S encapsulates the packet to Bp. The path from S to Bp is, according to the semantic the shortest path from S to B not going via P. If the network contains a path from S to B that does not transit router P, then the packet will be successfully delivered to B. For example the packet may be forwarded along path 222 to node X, 224, and then path 226 to node D. Because node X has calculated a repair path for Bp it will forward the encapsulated packet correctly. When the packet addressed to Bp arrives at B, B removes the encapsulation and forwards the repaired packet towards its final destination, node D.

Figure 3:
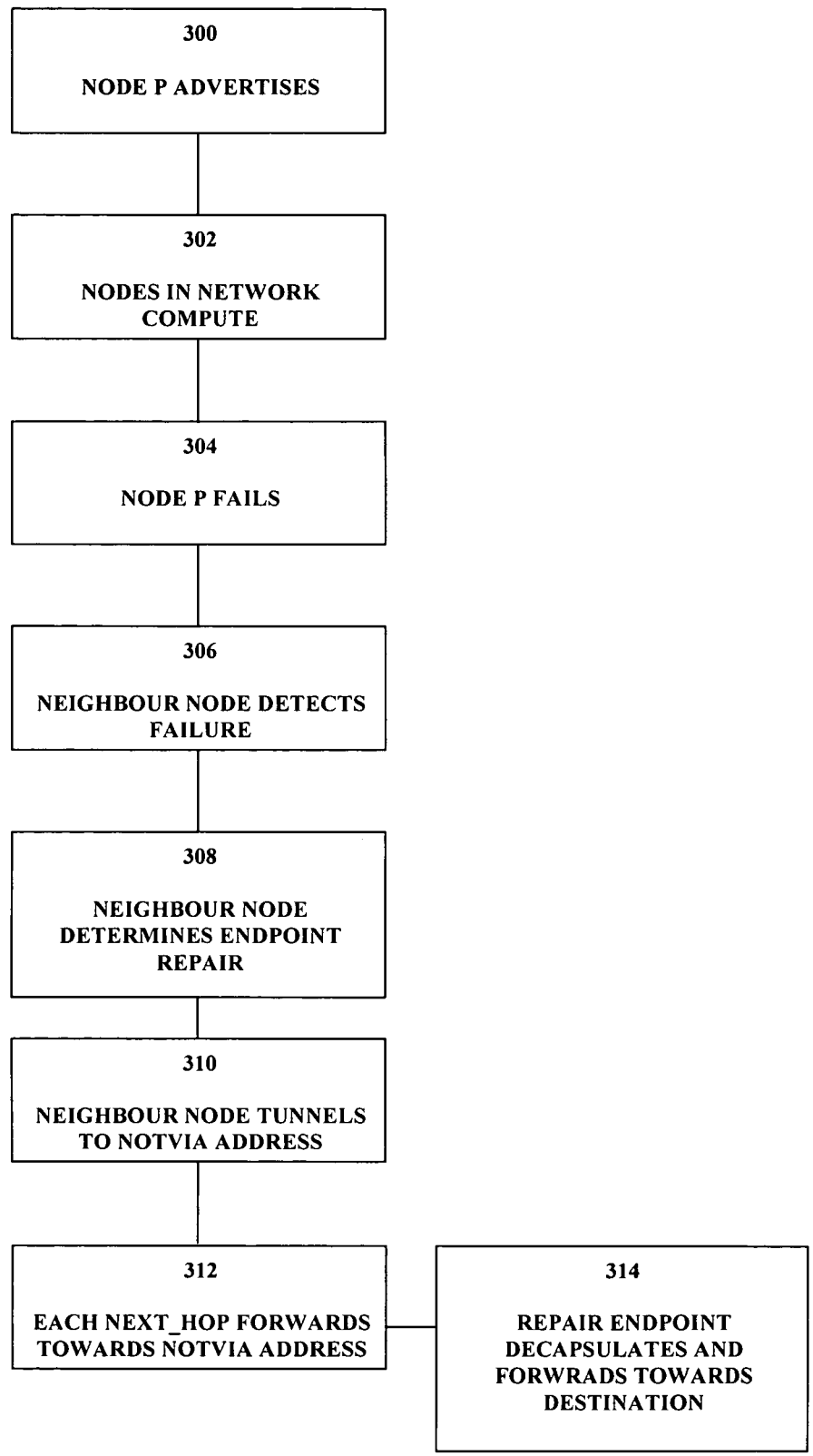
FIG. 3 is a flow diagram illustrating a method of constructing a repair path according to the present approach.

This can be further understood with reference to FIG. 3 which is a flow diagram illustrating at a high level the method applied herein. In block 300 node P advertises, using a notification such as an LSP, its adjacencies A, B, C, S and its associated notvia addresses Pa, Pb, Pc, Ps. It will be appreciated that all other nodes, acting as notifying node will also issue similar LSPs. As a result not only can appropriate forwarding tables be constructed, but also notvia addresses are available for each node in the event that it fails or otherwise becomes a non-available node, in which case the notvia address can be used as the repair address. Accordingly, in block 302, all participating nodes compute their next hops not only for each normal (non-failed) address but also for each notvia address. As a result each node constructs a repair path around each other node in the network and stores it against the corresponding notvia address.

In the event that node P subsequently fails or otherwise becomes unavailable, in block 304, then in block 306 the neighbor nodes detect or are notified of the failure in any appropriate manner. Where a neighbor node subsequently receives a packet which it would have sent to the failed component as its next hop then, acting as a repairing node, it identifies a repair end point or target to which it must tunnel such a packet to reach its subsequent destination in block 308. In the example given above, the repairing node is node S, and repair end point is node B for a packet with destination D. In particular this is identified by the respective notvia address Bp. As a result the node S tunnels the packet along the repair path to Bp in block 310. In block 312 each next hop forwards the encapsulated packet towards the notvia address Bp, for example node X in FIG. 2 forwards the packet correctly. Because all of the participating nodes have calculated a path to the notvia address using the same repair topology, a packet is forwarded using normal IP forwarding without the requirement for extensions to the forwarding code. In block 314 the packet arrives at the repair end point which decapsulates it and forwards the original packet towards its destination, again using normal IP forwarding for destination D in the example described.

As a result only one level of encapsulation is needed and it is possible to repair any failure, for example even when a network is highly asymmetric, in which case the P/Q-space approach described in Miles et al may theoretically fail. Furthermore the shortest available path around the failure is implemented, again without the need for additional forwarding mechanisms such as directed forwarding.

As described in more detail below, the method described with reference to FIG. 3 is extremely robust and applicable to a wide range of common network configurations and requirements. For example the method can be applied to repair of failed nodes or failed links and can incorporate strategies for single points of failure, that is, where a node provides the only connectivity to a neighbor node or a segment of a network. The approach can also be applied in the case of multi-homed prefixes (MHP), shared risk groups (SRG), local area networks (LAN) and uni-cast and multi-cast packets. In addition the approach can be implemented using, for example multiprotocol label switching (MPLS) or distance vector techniques. Yet further the approach can be implemented in the case that a sub-set of all of the nodes of a network only are participating nodes enabled to construct repair paths according to the method.

3.0 Method of Constructing a Repair Path

Referring once again to FIG. 2, it will be seen that in order to allow each enabled node on the network to construct a repair topology for a failed network component (link or node) each node must advertise its notvia addresses as well as the other relevant information stored in its LSP. Referring to FIG. 4, which is a diagram showing schematically the information contained in an LSP issued by node P, it will be seen that in addition to advertisement of each neighbor and its associated metric (e.g. the cost associated with the respective link) further information is provided. For example where the neighbor information is provided in column 400 and the associated metric in column 402, in addition a notvia address for each neighbor is provided in column 404. The notvia address is associated with the respective neighbor such that the entry against neighbor A effectively designates Pa. As long as the semantic is recognized by nodes receiving the LSP then the notvia address itself can take the form of a standard IP address shown schematically here as a.a.a.a representing Pa and so forth. It will be seen that, as every node in the network provides similar information, each node can derive repair paths for every notvia address on the network.

As a result, referring once again to the example described with reference to FIG. 2 in which node S encapsulates a packet destined for node D to Pb in the event of failure of node P, every node more generally calculates the path it would use in the event of any possible node failure. Each node therefore fails every other router in the network, one at a time, and calculates its own best route to each of the neighbors of that node. In other words, again with reference to FIG. 2, some router X will consider each router in turn to be P, fail P, and then calculate its own route to each of the notvia P addresses advertised by the neighbors of P. i.e. X calculates its route to Sp, Ap, Bp and Cp, in each case, notvia P.

Accordingly, referring to FIG. 5 which is a diagram illustrating relevant parts of the forwarding table derived at node S, it will be seen that for each address (column 500) the next hop (column 502) is derived, a notvia address (column 504) is designated and a corresponding repair address (column 506) is also implemented. For example where the destination is node B and the next hop is calculated as node P then, in addition, the repair address Bp to which the packet will be tunneled is stored together with the corresponding repair next hop. In this case this is the first hop along the path 222 from node S to node X in the example described above with reference to FIG. 2, indicated as node Z, reference numeral 228 along link 230 from node S. In the case of packets destined for node D, the normal next hop is node P and the repair address is Bp as a result of which the repair next hop is once again node Z for packets encapsulated to Bp. In the case of node A as destination address, the next hop is node P and the repair address is Ap providing some repair next hop $\Omega_1$ (not shown). The repair addresses in node S's forwarding table will always be to a neighbour's neighbour, i.e., the repair tunnel endpoint. However it will be seen that where the normal address in column 500 is a notvia address, for example Cp, then although a next hop is provided as node Y, reference numeral 232 along link 234 from node S, a repair address and repair next hop are not provided as described in more detail below. As a result, node S will forward a packet using normal forwarding to a notvia address, when it lies in another node's repair path, but will not instigate a repair tunneled to a notvia address when the incoming packet is already destined for a notvia address.

Figures 6, 7:
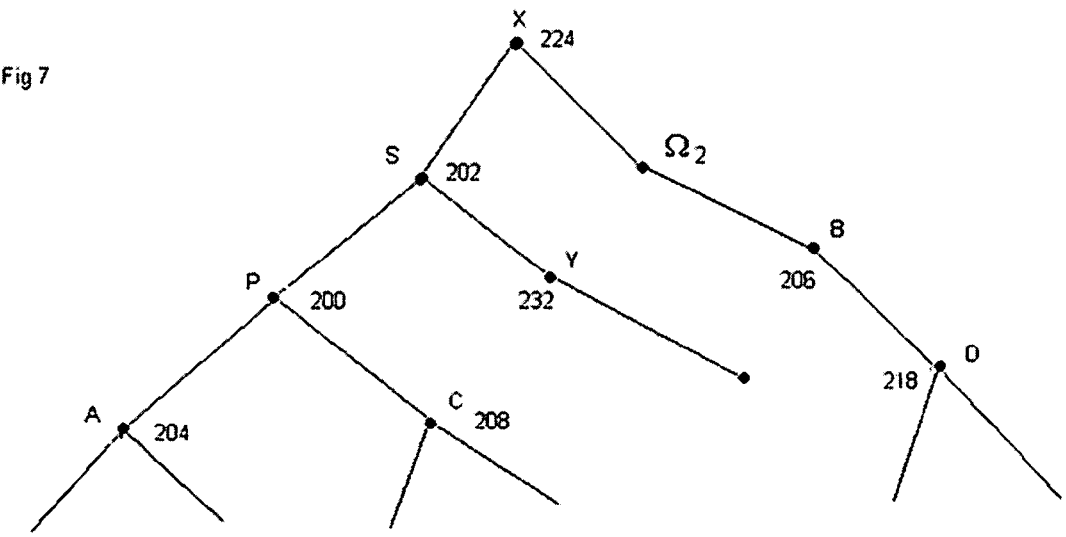
FIG. 6 is a diagram illustrating a forwarding table constructed at a non-neighbor node to non-available node.
FIG. 7 is a spanning tree diagram for a node implementing a method of constructing a repair path.

It will be appreciated that the manner in which the correct repair address is identified in the event of failure of a next hop, for a given packet to a given destination, may be determined in any appropriate manner for example from the SPT constructed at the node and described, for example, in Miles et al. It will further be seen that the repair addresses are derived from all of the LSPs received and not necessarily from the node around which the repair is eventually formed. For example, referring once again to FIG. 5, in the case of a packet destined for node B, in the event of failure of next hop node P, the repair address is Bp, which will have been received from node B, not node P. Referring to FIG. 6, which is a diagram showing aspects of a forwarding table constructed at node X, it will be seen that a similar table is constructed including destination address field 600, next hop field 602, for simplicity the repair address field and repair next-hop field are not shown but these would be populated in the same manner as for node S described above. In the fragment shown it will be seen that the next hop for destination addresses B and D some node $\Omega_2$ (not shown). The next hop for destination address Bp also happens to be $\Omega_2$ in the topology shown as the shortest path to B and D does not change in the repair topology.

Conversely failure of node P may mean that node X's next hop for Bp changes as well. As a result, as described in more detail below, in some instances it is possible to reduce the SPF calculation overhead in instances where the change between the normal topology and the repair topology, i.e. where the failed component is excised from the repair topology, does not affect certain nodes.

Various possibilities exist for reducing the computation overhead and in particular ensuring that each node does not have to calculate an entire SPF for the failure of each other possible node. Firstly, if a node can identify that it will not be in a repair path from another node to a repair address then it does not need to calculate its next hop for that repair address. It will be noted that packets tunneled to a repair address will only originate from nodes repairing around a failed component, i.e. on the other side of the failed component from the repair address. Accordingly this can be achieved by signaling from the repairing node to each other node in its repair path for a given repair address in which case each node receiving the signal will calculate its own next hop for that repair address. Alternatively some form of "discovered" signaling route can be built up. For example where node S sends a packet to its repair next hop (for example node X), if that repair next hop has not constructed a repair path it will drop the packet but then calculate its own repair next hop. If S, under the control of a higher level protocol, resends the packet when no acknowledgement is received from the final destination, node X will now forward the packet to its repair next hop which will also drop it but at the same time construct its own repair next hop. This process continues until the repair path is established at which point the acknowledgement will be sent.

According to a second manner of reducing the SPF calculation overhead, incremental SPFs can be implemented. This can be understood with reference to FIG. 7 which shows a partial SPT constructed at node X. X first calculates the base topology with all routers functional and determines its normal path to all node addresses. For example its next hop for nodes B and D is via $\Omega_2$, its next hop for nodes P and Y is via node S (node Z is ignored here for the purposes of simplicity) and node S's next hop for nodes A and C is via node P.

Figure 8:
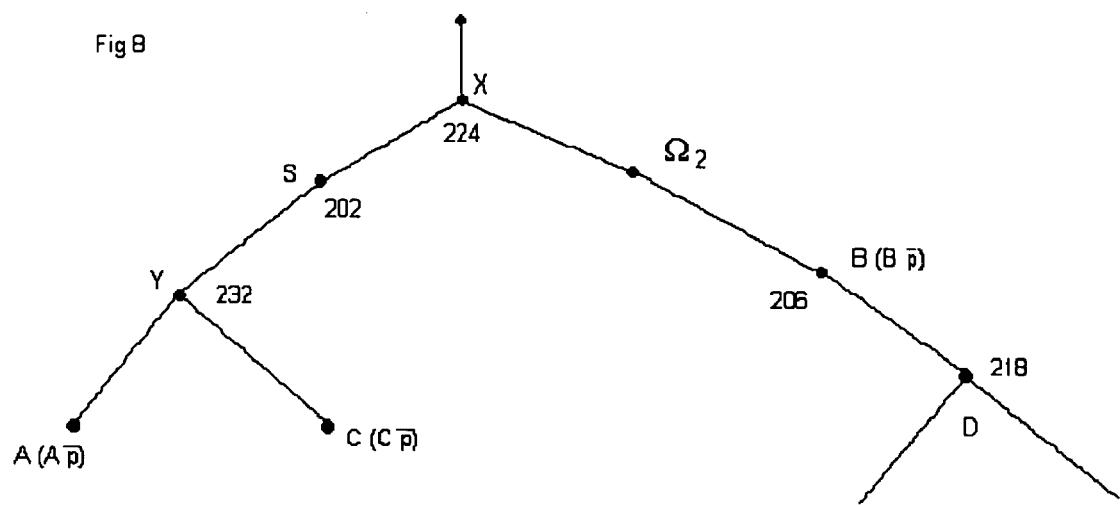
FIG. 8 is an incrementally changed spanning tree diagram for a node implementing a method of constructing a repair path.

Node X then fails router P and performs an incremental SPF. Incremental SPFs will be well known to the skilled reader and are not described in detail here but merely summarized for the purposes of explanation, referring to FIG. 8 which shows an incremental SPT. In particular it will be seen that node P has been excised from the repair topology as a result of which nodes A and C are re-attached to node Y but nodes B and D are unaffected. As a result the notvia addresses corresponding to p can be quickly calculated. Node X's next hop for Ap and Cp remains node S. However when node S recalculates its SPT it will instigate node Y as its repair next hop for Ap and Cp. Node X's next hop for nodes B and D are unaffected such that the next hop is $\Omega_2$ for destinations B, D, and Bp.

As a result the incremental calculation can be terminated when all of the addresses previously reached via P are reattached. Node X then reverts to the base topology and repeats the process failing each router in turn and deriving the notvia addresses accordingly. The algorithm is significantly less expensive than a set of full SPFs. In particular, although a router still has to calculate the repair path for N–1 failures, the computational effort is much less than N–1 SPFs.

Figure 9:
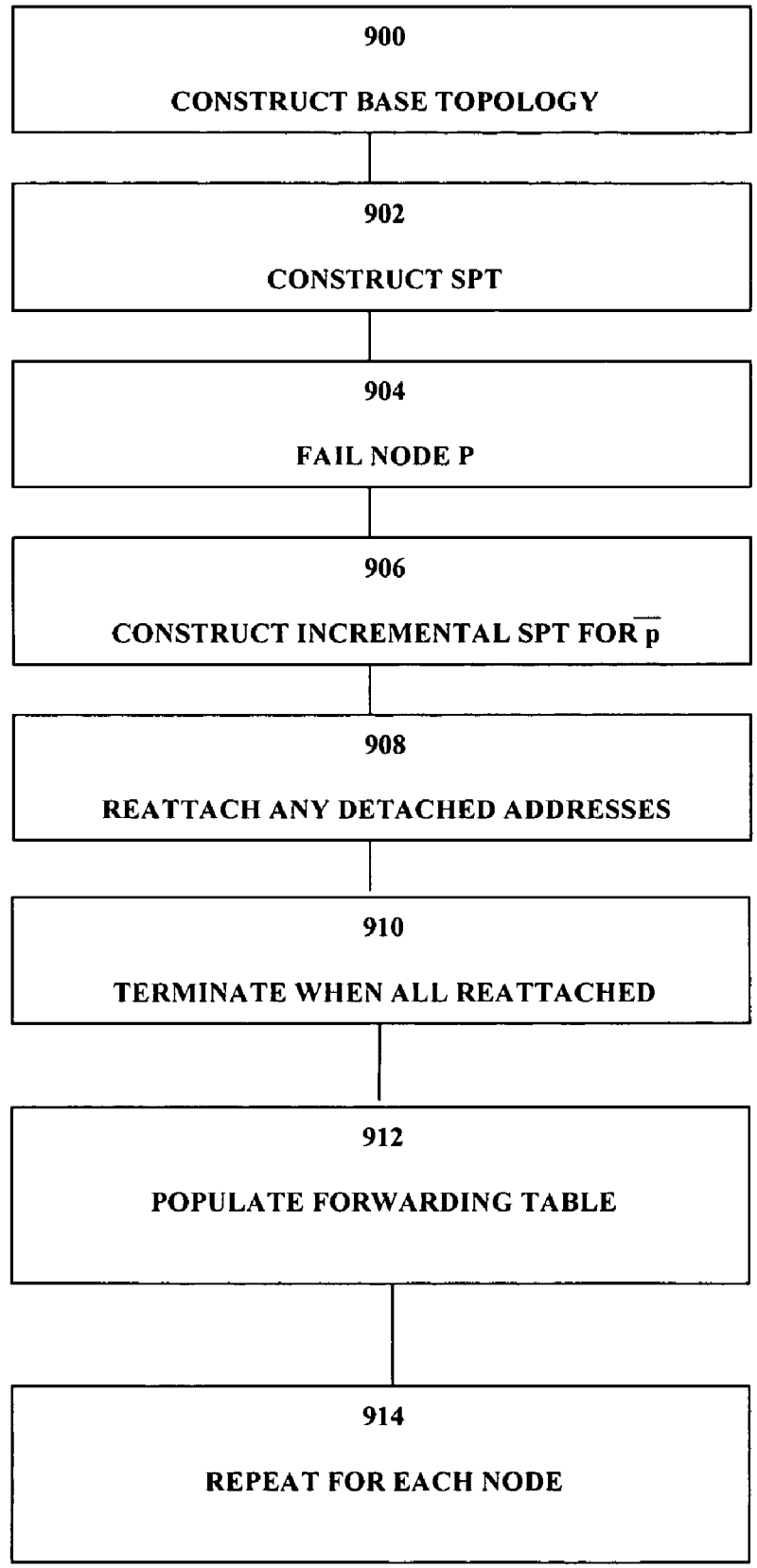
FIG. 9 is a flow diagram illustrating a method of constructing a repair path using incremental SPF.

The approach can be understood further with reference to FIG. 9 which is a flow diagram illustrating calculation of the SPFs. In block 900 node X constructs a base topology of all nodes in the network. In block 902 node X constructs a corresponding SPT. In block 904 node X fails a node P and in block 906 node X constructs an incremental SPT, excising node P from the repair topology for p. In block 908 any detached notvia addresses are reattached together with any other nodes that must be reattached to allow reattachment of the notvia addresses and in block 910 the calculations terminate when all of the addresses are reattached. In block 912 the forwarding table is then populated with all of the next hops for notvia P addresses, e.g. Ap, Bp, Cp and so forth. In block 914 the procedure is repeated for every other participating node in the network.

It will be seen that the approach described herein can be applied both in the case of node or link failure. The discussion provided above is directed particularly to node failure, the construction of repair paths or notvia addresses being based around the node failure and SPTs derived accordingly. However it will be appreciated that, in a similar manner, the invention can be directed to link failure.

For example in the case of FIG. 2 node S and/or node P can additionally or alternatively advertise a notvia address based around the failure of link 210. In that case the notvia address would be advertised once again using an appropriate semantic such that receiving nodes recognized the type of address and the required calculations to obtain a link repair next hop. For example the incremental SPT approach described above with reference to FIGS. 7 to 9 would be based on a repair topology where, instead of removal of node P (and hence all links between node P and other nodes), only the link 210 between nodes S and P would be removed and the incremental SPT calculated accordingly.

Assuming link rather than node failure is of assistance where some destinations are only reachable through the failed router, it is desirable that an attempt be made to repair to those destinations by assuming that only a link failure has occurred, and using the notvia addresses calculated for node failure to attempt link repair.

To perform a link repair, S encapsulates to Ps(i.e. it instructs the network to deliver the packet to the node repair address P notvia S). All of the neighbors of S will have calculated a path to Ps in case S itself had failed. S could therefore give the packet to any of its neighbors (except, of course, P). However, S should preferably send the encapsulated packet on the shortest available path to P. This path is calculated by running an SPF with the link SP failed.

In the event that this link repair is attempted in the presence of node failure in which case other neighbors of the failed node could be running conflicting repair strategies then looping is avoided in a very simple manner. In particular as discussed above with reference to FIG. 5, it is ensured that a repair path is not provided for a notvia address. Referring to FIG. 2, if A were the neighbor of P that was on the link repair path from S to P, and P itself had failed, the repaired packet from S would arrive at A encapsulated to Ps. A would have detected that AP link had failed and would normally attempt to repair the packet. However, as no repair path is provided for Ps, A would be forced to drop the packet, thus preventing the formation of loops.

This approach is advantageous in the case, for example, of instances of single point of failure. Referring once again to FIG. 2, where node P provides the only connectivity to a node W reference numeral 240 when node W itself may provide connectivity with a segment of the network in addition, if node P fails then no node in the network can reach node W. Accordingly where node S detects failure at its interface to node P it may be desirable to assume that only the link 210 has failed rather than node P. As a result S encapsulates packets destined for node W to Ps. Although node S could theoretically send the packet to any of its neighbours it will optimally use the shortest path to Ps. When the packet arrives at P, P will strip the encapsulation and send the packet to W. However, if P has really failed, the packet will arrive at a neighbor of P (still addressed in the encapsulation to Ps), and since the neighbor has no repair path for a notvia address, it will drop the packet, hence avoiding a loop as described above.

It will further be seen that in the case of topologies where equal cost multi-path routes (ECMP) are available or downstream path routes are available then these can be implemented accordingly. For example where a downstream path or loop free alternate (LFA) exists, a repairing node such as node S may use this in place of the notvia repair mechanism in appropriate circumstances. Similarly a router can use an ECMP repair in place of a notvia repair.

Figure 10:
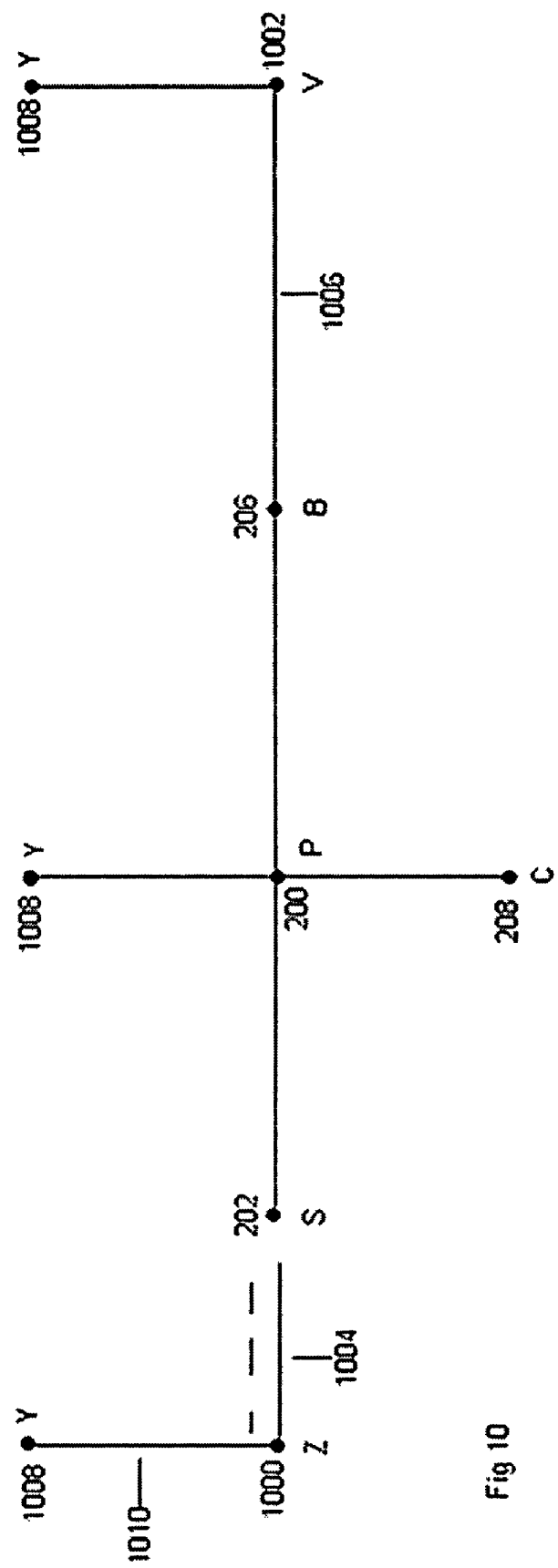
FIG. 10 is a representation of a network illustrating further implementations of the present approach.

It can be seen that the approach described herein is applicable to a wide range of network configurations and circumstances. For example in the case of a multi-homed prefix (MHP), that is a prefix reachable via more than router in the network (and hence having "multiple homes") the approach can be implemented. FIG. 10 is a diagram showing a network including a multi-homed prefix Y. The network includes nodes S, P, B and C according to the connectivity described with reference to FIG. 2 above. In addition node S is connected to node Z 1000 and node B is connected to node V 1002 by respective paths 1004, 1006. An MHP Y, reference numeral 1008 is attached at nodes Z, P and V. In that case when node S discovers that node P has failed it needs to send MHP packets addressed to Y, which are normally reachable through P, to an alternate route which is still able to reach Y.

Figure 11:
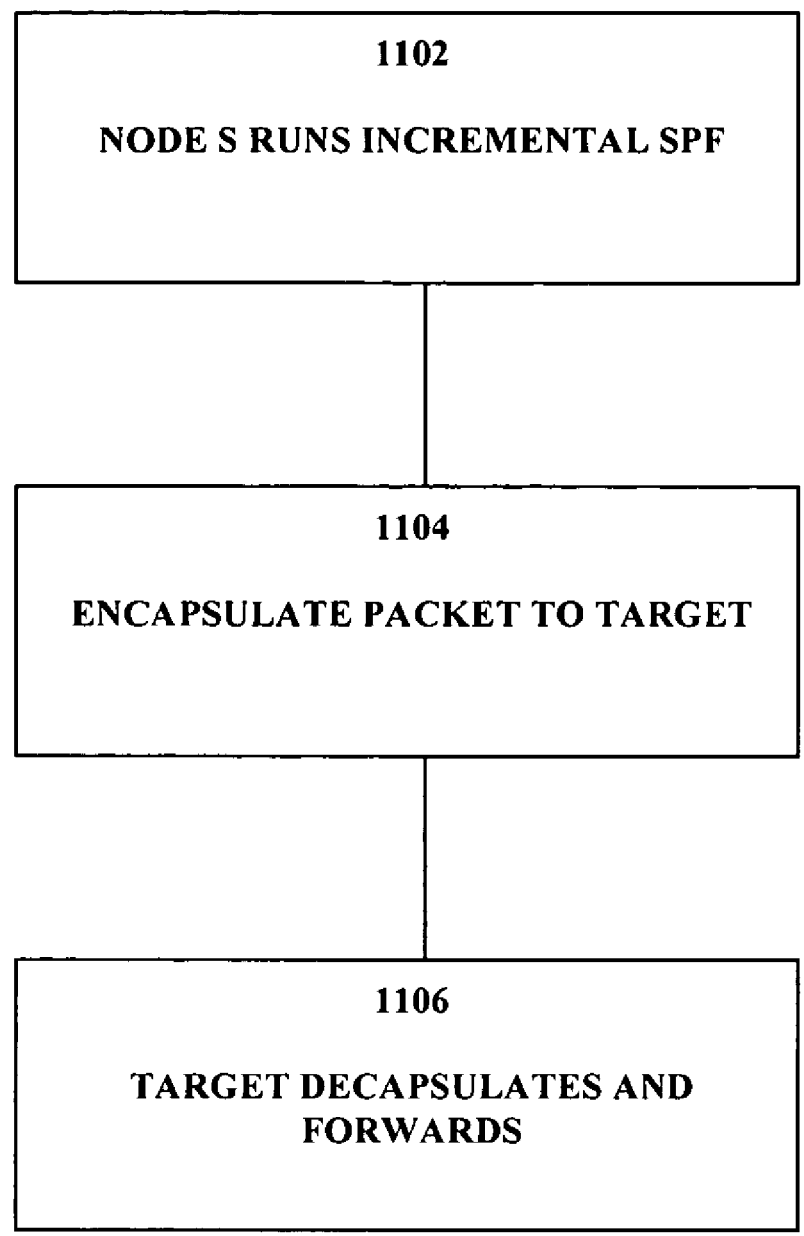
FIG. 11 is a flow diagram illustrating a method of constructing a repair path for an MHP.

Referring to FIG. 11, which is a flow diagram illustrating the steps involved in forwarding MHP packets, in step 1102 node S runs its incremental SPF in the manner described above with reference to FIGS. 7 to 9, with node P failed, until all neighbors of P and an instance of MHP Y (which will be the second closest) is attached. Node S may identify when all appropriate nodes are reattached in any appropriate manner, for example by logging all MHPs during the base SPF and ensuring that all are reattached to the incremental SPF.

In block 1104 node S encapsulates the packet to the prefix attachment point identified as the closest alternate node. In the event that this is at node Z, which S can reach without using the node P, encapsulation is still required because the other nodes in the network will not be aware of the failure of node P, and may loop the packet back to S. In block 1106, therefore, node Z decapsulates the packet and forwards it to node X. It will be noted that node Z will include forwarding instructions that ensure that decapsulated packets for MHP Y must be forwarded along the connecting link 1010 to node Y to avoid potential looping in the event that nonetheless a lower cost route exists via node P.

In the event that the alternate router is node V, which node S reaches via node P and node B, node S must first repair the packet to node B using the normal notvia repair mechanism. Accordingly node S encapsulates the packet for node Y to Bp. When the packet reaches node B, node B decapsulates it and sees a packet destined for MHP Y. As node B will have established that node P has failed and will have carried out the same calculations as node S it will recognize that its closest attachment point for MHP Y is node V, following the same computation as were carried out at node S, and repairs it normally, encapsulating it to V.

In an alternative approach the prefix Y can be considered attached to a pseudo node N in turn connected to each of nodes B, V, Z in which case the respective interfaces are assigned notvia addresses and the repair path approach is described above implemented. It will be recognized that the concept of a "pseudo node" is well known to the skilled reader and provides a useful topological invention for treatment of MHPs and LANs such that detailed description is not required here.

Figure 12:
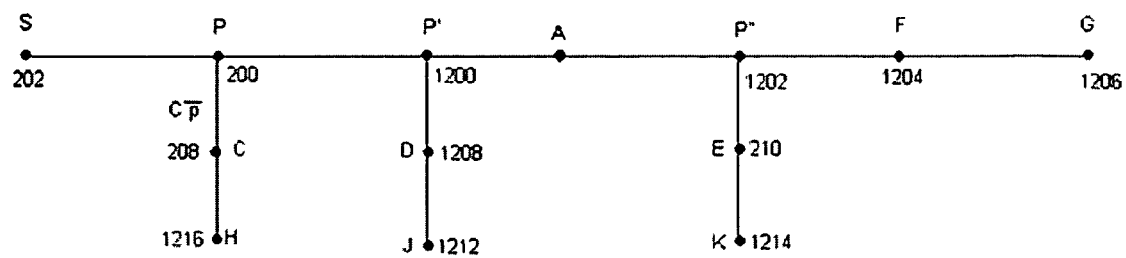
FIG. 12 is a representation of a network illustrating further implementations of the present approach.

The method described herein is also suitable for use in networks containing shared risk groups (SRG), that is groups of network components that are identified as having a probability of failing concurrently, for example because of a common physical location. FIG. 12 is a schematic network diagram illustrating a network including a shared risk group and common elements with FIG. 2 are commonly numbered. In addition the network includes a node P', 1200 and P", 1202 where P' is connected between nodes P and A and P" is connected to the other side of node A. Node F (1204) is connected to node P" and node G (1206) to node F. Nodes D and E, reference numerals 1208, 1210 respectively, are connected to nodes P' and P". Nodes J and K, reference numerals 1212, 1214, are connected to nodes D and E respectively. Node H, reference numeral 1216, is connected to node C.

Nodes P, P', P" form an SRG as a result of which, if it is assumed that all members of the SRG fail simultaneously, the scope of the notvia address indicates "notvia the whole SRG". In other words Ap=Ap,p',p". All routers calculate a notvia route to each of the notvia addresses of the interfaces that connect the SRG to the rest of the network, the calculation being made by simultaneously failing all members of the SRG, P, P', P" in a single incremental SPF. In order to identify an SRG each node retains records of nodes in the network belonging to respective SRGs.

Then, when a router that is adjacent to an SRG member makes a repair, it encapsulates the packet to the notvia address of the router which has the lowest cost route from the SRG to the destination. For example with reference to FIG. 12, where S receives a packet destined for node H which would normally be forwarded via nodes P and C, upon detection of the failure of the SRG, node S will encapsulate the packet to node Cp via appropriate connectivity (not shown). Similarly node S will encapsulate packets for node J to Dp and so forth.

It will be further noted that in addition to creating a notvia address for the SRG group, individual notvia addresses can also be formed for each member of the group. For example these could be used first which could be beneficial, for example, in the event that a member of the group comprised a single point of failure. In the same manner as for link failure protection, looping is avoided because repair paths are not stored for neighbor notvia addresses.

Figure 13:
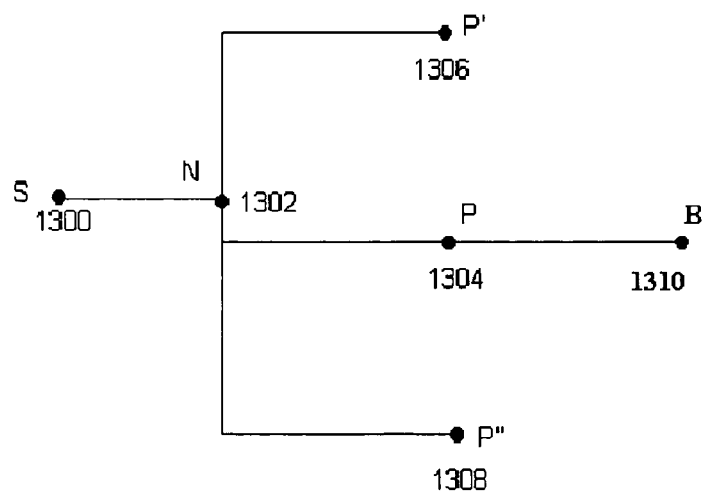
FIG. 13 is a representation of a network illustrating further implementations of the present approach.

It will further be seen that the approach described herein can be implemented in relation to local area networks with reference to FIG. 13 which is a network diagram illustrating an LAN. Node S 1300 is connected to a pseudo node N, 1302 which itself connects to members of a LAN node P, 1304, node P', 1306 and P", 1308. Node P is connected to node B, 1310. The LAN can be treated as a special case of an SRG such that a notvia address is created against failure of all members of the LAN, termed here L. Then node S can provide repair paths for traffic for which it has an alternative path avoiding L. A more sophisticated approach can be adopted if L has a capability of testing members of the LAN in which case it can use notvia addresses only against known failed nodes on the LAN. As with SRG calculations only a single incremental SPF is required to calculate the notvia repair paths for group L.

When S discovers that it has lost connectivity to P, it is unsure whether the failure is its own interface to the LAN, the LAN itself, the LAN interface of P or the node P. With no further diagnostics S must repair traffic sent through P and B, to B notvia P,N (i.e. not via P and not via N), on the conservative assumption that both the entire LAN and P have failed. Destinations for which P is a single point of failure must as usual be sent to P using an address which avoids the interface by which P is reached from S, i.e. to P notvia N, similarly for routers P' and P". Each router that is connected to a LAN must, as usual, advertise one notvia address for each neighbor. In addition, each router on the LAN must advertise an extra address not via the pseudonode (N). In addition, each neighbor of a router connected to a LAN must advertise two notvia addresses, the usual one not via the neighbor and an additional one, not via either the neighbor or the pseudonode, exactly one address more than it would otherwise have advertised if this degree of connectivity had been achieved through the use of point to point links. As indicated above, to explicitly diagnose the failed network component S correlates the connectivity reports from P and one or more of the other routers on the LAN, in this case, P' and P". If it lost connectivity to P alone, it could deduce that the LAN was still functioning and that the fault lay with either P, or the interface connecting P to the LAN. It would then repair to B not via P (and P notvia N for destinations for which P is a signal point of failure) in the usual way. If S lost connectivity to more than one router on the LAN, it could conclude that the fault lay only with the LAN, and could repair to P, P' and P" notvia N, again in the usual way. If S fails, router A needs to be able to repair to every router on the LAN notvia S which it does in the usual way using the set of notvia S addresses. An alternative approach that provides less post-failure connectivity, but uses fewer addresses is to consider the LAN and all of its connected routers as a single SRG. Thus the address P not via the LAN (PI) would require P to be reached notvia any router connected to the LAN. In this case when S detected that P had failed it would send traffic reached via P and B to B notvia the LAN or any router attached to the LAN (i.e. to Bl). Any destination only reachable through P would be addressed to P notvia the LAN or any router attached to the LAN (except of course P).

The approach can be used in relation to further implementations again. For example in the case of multi-cast packets, multi-cast traffic is repaired in a similar way to uni-cast. However the multi-cast forwarder is able to use the notvia address to which the multi-cast packet was addressed as an indication of the expected receiver interface and hence to correctly run the required reverse path forwarding (RPF) check.

Furthermore techniques such as stripping the tunnel header at a penultimate node to a node which will forward the unencapsulated packet to the desired repair end point can be adopted. Such an approach is described in co-pending patent application Ser No. 10/620,866, filed 15 Jul. 2003, entitled "Method and Apparatus for Forwarding a Tunneled Packet in a Data Communications Network" of Michael Shand et al ("Shand et al III"), the entire contents of which are incorporated herein by reference for all purposes as if fully set forth herein.

It will further be seen that the method described herein can be implemented in relation to alternative routing protocols or forwarding paradigm.

One such paradigm is MPLS (Multi Protocol Label Switching). MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are pre-pended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the next hop router on the path as determined from its IP routing table. Alternatively Resource Reservation Protocol (RSVP) can be invoked in which case, for example, a network administrator can engineer a path, providing strict source routing. In particular LDP will distribute labels for the notvia addresses in the usual manner. The notvia repair mechanism may therefore be used to provide repair paths in an MPLS network by first pushing the label which the repair point uses to forward the packet and then pushing the label corresponding to the notvia address needed to effect the repair. For example with reference to FIG. 2, where node S has a packet destined for node D that it would normally reach via nodes P and B, in the event that node P has failed, node S first pushes B's label for D and then the label that its next hop to Bp(node X) needs to reach Bp, i.e. $[B_d, N_{Bp}]$. Once again the notvia addresses have been propagated and are recognized, so that this approach is simply implemented. It will be noted that node S requires node B's label for D, $B_D$. This can be achieved in any appropriate manner, for example a directed LDP session. In order to obtain all appropriate labels node S can carry out a directed LDP session with each of node P's neighbors in the case of node repair or all of the egress routers in the case of an SRG. In the case of link repair node S will have node P's label for D $P_D$ already as P is a neighbor node. Of course any appropriate manner for obtaining the repair point's label for the destination node can be adopted, for example, any appropriate approach described in Swallow et al.

Alternatively again the approach may be implemented using routing vector protocols such as distance or path vectors in which an advertising node advertises to all other nodes its full route or vector to a destination. In that case node P effectively advertises its notvia address by omitting vectors for each of its neighbors Ap, Bp, Cp, Sp. As a result, if P fails, there is no information at any node about how to reach B via P in any case such that it effectively has a notvia route selected via another node. As a result all nodes will compute routes which do not traverse node P.

It will be further seen that the method described can be implemented across a network in which all routers are enabled to compute notvia addresses and hence acting as participating nodes, in which only a subsection of routers are enabled or in which some routers are partially enabled. In the case that all routers are enabled and have repair address capability then clearly the method can be implemented very simply as described above. In the case that some routers are enabled and others are not then, when calculating notvia paths, non-enabled nodes are removed from the base topology. As a result no routes to a notvia address will ever be calculated that would attempt to traverse a non-enabled node such that non-enabled nodes will not receive notvia addresses which they are not equipped to deal with. It is possible that routers will be partially enabled, for example such that they are able to derive repair paths themselves and hence receive and forward packets to notvia addresses correctly but not themselves act as neighbor routers carrying out the encapsulation and forwarding steps as described above. In that case partially enabled routers can be included in the repair topology but will not themselves be able to instigate repairs.

The manner in which the method described herein is implemented in which software, firmware, hardware or any combination thereof and with any appropriate code changes as will be apparent to the skilled reader without the need for detailed description herein. For example extensions to the communication protocols such as the interior gateway protocol (IGP) may require extensions. In particular each enabled router that is directly connected to a protected network component will advertise a notvia address for that component in such a way that the association between the protected component and the notvia address can be determined by the other routers in the network as described above. Furthermore, enabled routers may advertise their capability for calculating and implementing notvia routes in the IGP together with the type of encapsulation that they support, for example IP in IP, GRE, L2TPv3 all of which will be well known to the skilled reader.

The addresses assigned as notvia addresses can be any appropriate addresses for example taken from a private address space for the network.

Any appropriate encapsulation may be used to carry a notvia repair, for example IP in IP, GRE or L2TPv3. Similarly any alternate encapsulation scheme can be adopted as long as the encapsulating router and the router to which the encapsulated packet is addressed as repair point have a common ability to process the chosen encapsulation type.

As a result of the approaches described above, a simple procedure is applied according to which only a single level of encapsulation is required and which, because all nodes effectively compute shortest repair paths, it provides shortest repair paths for any failure. Furthermore it will be seen that decapsulated packets may "backtrack" that is, be forwarded to one or more nodes from which it has arrived via the tunnel but still be forwarded using normal forwarding, without looping towards the destination because the repair point is closer to the destination.

4.0 Implementation Mechanisms—Hardware Overview

FIG. 14 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a participating node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

What is claimed is:

1. A method of constructing a repair path around a non-available component in a data communications network having, as components, nodes having a network address and links there between, the method comprising the steps:
at each repairing node:
for each notifying node that is not the repairing node:
while the notifying node is still available:
receiving, from the notifying node in the network, a notification identifying:
the notifying node, and a set of all components that are adjacent to the notifying node and through which the notifying node is reachable;
for each component from the set of all components that are adjacent to the notifying node and through which the notifying node is reachable:
deriving, from the notification, a network repair address for use in the event of non-availability of the component identified in the notification; and
using the network repair address from the notification, constructing a repair path for the component identified in the notification for use in the event of non-availability of the component identified in the notification;
wherein the method is performed by one or more processors.

2. A method as claimed in claim 1 in which the components through which the notifying node is reachable comprise an adjacent link, which is adjacent to the notifying node.

3. A method as claimed in claim 1 in which the step of constructing a repair path comprises constructing a repair network topology omitting the non-available component and identifying a repair path to a component in a repair topology.

4. A method as claimed in claim 3 in which the repair topology is only constructed for components to which a path is affected by omission of the non-available component.

5. A method as claimed in claim 3 in which the repair topology excludes network components which do not have repair address capability.

6. A method as claimed in claim 1 further comprising the step of sending network traffic destined for a repair address via the corresponding repair path.

7. A method as claimed in claim 6 in which the traffic is encapsulated to the repair address, further comprising the step of decapsulating the packet at a preceding component to the repair address.

8. A method as claimed in claim 1 in which the repairing node comprises
a neighbor node to the non-available component, and in which the repairing node further identifies, for a destination address, a repair address as an encapsulation repair endpoint for a repair to the destination address in the event of non-availability of the component.

9. A method as claimed in claim 8 further comprising, in the event of non-availability of the component requiring a repair path, the step, performed at the repairing node, of encapsulating traffic for the repair path to the repair address.

10. A method as claimed in claim 8 in which the repairing node does not identify an encapsulation repair endpoint for a destination address comprising a repair address.

11. A method as claimed in claim 1 in which the data communications network includes, as components, multi-homed prefixes further comprising the steps, performed at a participating node, of:
determining if an attachment point to a multi-homed prefix is reachable without a repair path and encapsulating a packet to the attachment point if so; and
if an attachment point to the multi-homed prefix is only reachable via a repair path, encapsulating traffic to the corresponding repair address.

12. A method as claimed in claim 1 in which the data communications network includes a shared risk group comprising a plurality of components, further comprising the steps, performed at a participating node, of:
deriving a network repair address for use in event of non-availability of the shared risk group; and
constructing a repair path for the repair address.

13. A method as claimed in claim 12 in which the shared risk group is a plurality of links or nodes in a Local Area Network (LAN).

14. A method as claimed in claim 1 in which the repair path is constructed for multi-cast traffic.

15. A method as claimed in claim 1 using one of link state routing, Multiprotocol Label Switching (MPLS) routing or distance vector routing.

16. A method as claimed in claim 1 further comprising:
identifying whether the repairing node is in a repair path for a repair address; and
only constructing a repair path for the repair address in that instance.

17. A method of notifying components in a data communications network of notifying node reachability comprising the steps of:
at each repairing node:
for each notifying node that is not the repairing node:
while the notifying node is still available:
identifying in a notification the notifying node and a set of all components that are adjacent to the notifying node and through which the notifying node is reachable;
for each component from the set of all components that are adjacent to the notifying node and through which the notifying node is reachable:
identifying in the notification a network repair address for use in the event of non-availability of the component identified in the notification; and
advertising the notification to every notifying node, wherein the notification comprises the network repair address used by the another node in constructing a repair path for the component identified in the notification;
wherein the method is performed by one or more processors.

18. A method as claimed in claim 17, in which the components through which the notifying node is reachable comprise an adjacent link, which is adjacent to the notifying node.

19. A method as claimed in claim 17, using one of link state routing, Multiprotocol Label Switching (MPLS) routing or distance vector routing.

20. A computer readable non-transitory storage medium comprising one or more sequences of instructions which, when executed by one or more processors, cause the one or more processors to perform the steps of:
at each repairing node:
for each notifying node that is not the repairing node:
while the notifying node is still available:
receiving, from the notifying node in a network, a notification identifying:
the notifying node, and
a set of all components that are adjacent to the notifying node and through which the notifying node is reachable;
for each component from the set of all components that are adjacent to the notifying node and through which the notifying node is reachable:
deriving, from the notification, a network repair address for use in the event of non-availability of the component identified in the notification; and
using the network repair address from the notification, constructing a repair path for the component identified in the notification for use in the event of non-availability of the component identified in the notification.

21. A computer readable non-transitory storage medium as claimed in claim 20, in which the components through which the notifying node is reachable comprise an adjacent link, which is adjacent to the notifying node.

22. A computer readable non-transitory storage medium as claimed in claim 20, using one of link state routing, Multiprotocol Label Switching (MPLS) routing or distance vector routing.

23. An apparatus comprising:
one or more processors; and
a network interface communicatively coupled to the one or more processors and configured to communicate one or more packet flows among the one or more processors in a network and a computer readable medium comprising one or more sequences of instructions which, when executed by the one or more processors, cause the one or more processors to perform the steps of:

at each repairing node:
  for each notifying node that is not the repairing node:
    while the notifying node is still available:
      receiving, from the notifying node in the network, a notification identifying:
        the notifying node, and a set of all components that are adjacent to the notifying node and through which the notifying node is reachable;
      for each component from the set of all components that are adjacent to the notifying node and through which the notifying node is reachable:
        deriving, from the notification, a network repair address for use in the event of non-availability of the component identified in the notification; and
        using the network repair address from the notification, constructing a repair path for the component identified in the notification for use in the event of non-availability of the component identified in the notification.

24. An apparatus as claimed in claim 23, in which the components through which the notifying node is reachable comprise an adjacent link, which is adjacent to the notifying node.

25. An apparatus as claimed in claim 23, using one of link state routing, Multiprotocol Label Switching (MPLS) routing or distance vector routing.

26. An apparatus for constructing a repair path around a non-available component in a data communications network having, as components, nodes having a network address and links there between, the apparatus comprising:
one or more processors;
at each repairing node:
  for each notifying node that is not the repairing node:
    while the notifying node is still available:
      means for receiving, from the notifying node in the network, a notification identifying:
        the notifying node, and a set of all components that are adjacent to the notifying node and through which the notifying node is reachable;
      for each component from the set of all components that are adjacent to the notifying node and through which the notifying node is reachable:
        means for deriving, from the notification, a network repair address for use in the event of non-availability of the component identified in the notification; and
        means for constructing a repair path for the component identified in the notification using the network repair address from the notification for use in the event of non-availability of the component identified in the notification.

27. An apparatus as claimed in claim 26, in which the components through which the notifying node is reachable comprise an adjacent link, which is adjacent to the notifying node.

28. An apparatus as claimed in claim 26, using one of link state routing, Multiprotocol Label Switching (MPLS) routing or distance vector routing.

29. An apparatus for notifying components in a data communications network of notifying node reachability comprising:
one or more processors;
at each repairing node:
  for each notifying node that is not the repairing node:
    while the notifying node is still available:
      means for identifying the notifying node and a set of all components that are adjacent to the notifying node and through which the notifying node is reachable in the notification;
      for each component from the set of all components that are adjacent to the notifying node and through which the notifying node is reachable:
        means for identifying in the notification a network repair address for use in the event of non-availability of the component identified in the notification; and
        means for advertising the notification to another node, wherein the notification comprises the network repair address used by another node in constructing a repair path for the component identified in the notification.

30. An apparatus as claimed in claim 29, in which the components through which the notifying node is reachable comprise an adjacent link, which is adjacent to the notifying node.

31. An apparatus as claimed in claim 29, using one of link state routing, Multiprotocol Label Switching (MPLS) routing or distance vector routing.

* * * * *